United States Patent [19]

Dannheim et al.

[11] Patent Number: 5,559,215
[45] Date of Patent: Sep. 24, 1996

[54] BLACK MIXTURE OF FIBRE-REACTIVE AZO DYES CONTAINING ESSENTIALLY A NAVY-BLUE DISAZO DYE AND AN ORANGE MONOAZO DYE, AS WELL AS NOVEL FIBRE-REACTIVE PHENYLAZONAPHTHOL DYES CONTAINING A 2-(2'-SUFOPHENYLAMINO)-4-FLUORO-1,3,5-TRIAZIN-6-YLAMINO GROUP

[75] Inventors: Jörg Dannheim, Frankfurt; Werner H. Russ, Flörsheim, both of Germany

[73] Assignee: Hoechst Aktiengesellschaft, Germany

[21] Appl. No.: 430,405

[22] Filed: Apr. 28, 1995

[30] Foreign Application Priority Data

May 2, 1994 [DE] Germany ............... 44 15 385.6

[51] Int. Cl.$^6$ ............... C09B 62/008; C09B 43/16; C09B 67/22; C09B 67/24; D06P 1/38; D06P 3/10
[52] U.S. Cl. ............... 534/573; 8/543; 8/549; 8/641; 534/617; 534/637; 534/638; 534/642
[58] Field of Search ............... 534/573 M, 638, 534/617, 642, 637; 8/641, 543, 549

[56] References Cited

U.S. PATENT DOCUMENTS

| | | | |
|---|---|---|---|
| 3,223,470 | 12/1965 | Boedeker et al. | 534/638 X |
| 3,325,242 | 6/1967 | Bosshard et al. | 534/638 X |
| 4,649,193 | 3/1987 | Meininger et al. | 534/638 X |
| 5,210,187 | 5/1993 | Patsch et al. | 534/618 |
| 5,233,026 | 8/1993 | Tzikas | 534/636 |
| 5,304,221 | 4/1994 | Schwarz et al. | 8/549 |

FOREIGN PATENT DOCUMENTS

| | | | |
|---|---|---|---|
| 2132480 | 3/1995 | Canada | 8/549 |
| 0111830 | 6/1984 | European Pat. Off. | 534/636 |
| 0177445 | 4/1986 | European Pat. Off. | 534/636 |
| 0545219 | 6/1993 | European Pat. Off. | 534/637 |
| 0644240 | 3/1995 | European Pat. Off. | 534/638 |
| 62-285955 | 12/1987 | Japan | 534/573 M |
| 2-073870 | 3/1990 | Japan | 534/638 |
| 2-202956 | 8/1990 | Japan | 534/638 |
| 91/2676 | 4/1991 | Rep. of Korea | 534/638 |
| 92/6368 | 8/1991 | Rep. of Korea | 534/638 |
| 91/8343 | 10/1991 | Rep. of Korea | 534/638 |

Primary Examiner—Floyd D. Higel
Attorney, Agent, or Firm—Connolly & Hutz

[57] ABSTRACT

Black fiber-reactive azo dye mixtures and use thereof for dyeing hydroxy- and/or carboxamido-containing fiber material Mixtures of fiber-reactive dyes are described which can be used to obtain deep black dyeings and prints on hydroxy- and/or carboxamido-containing fiber materials such as cellulose fiber materials, wool and synthetic polyamide fibers by the application methods which are customary in the art for fiber-reactive dyes. The dye mixtures comprise one or more disazo dyes of the formula (1) and one or more monoazo dyes of the formula (2)

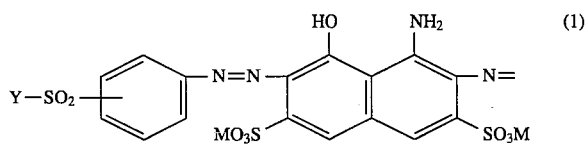

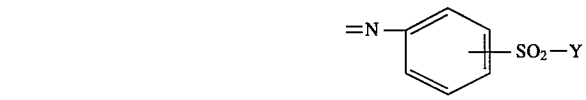

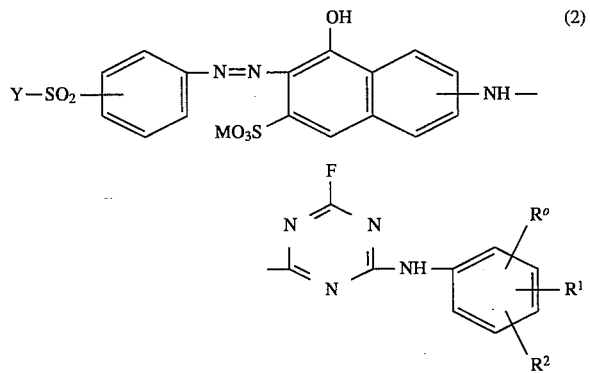

in which M is hydrogen or an alkali metal, $R^o$ is sulfo or carboxyl, $R^1$ is hydrogen, methyl, ethyl, methoxy, ethoxy, sulfo or carboxy, $R^2$ is hydrogen, methyl, ethyl, methoxy or ethoxy, Y is at each occurrence independently of the others vinyl, β-chloroethyl, β-phosphatoethyl, β-thiosulfatoethyl or β-sulfatoethyl, and in formula (2) the fluorotriazinylamino group is attached in position 2 or 3 to the 8-hydroxy-6-sulfonaphthalene radical.

4 Claims, No Drawings

BLACK MIXTURE OF FIBRE-REACTIVE AZO DYES CONTAINING ESSENTIALLY A NAVY-BLUE DISAZO DYE AND AN ORANGE MONOAZO DYE, AS WELL AS NOVEL FIBRE-REACTIVE PHENYLAZONAPHTHOL DYES CONTAINING A 2-(2'-SUFOPHENYLAMINO)-4-FLUORO-1,3,5-TRIAZIN-6-YLAMINO GROUP

The invention is in the technical field of fiber-reactive dyes.

Black-dyeing dye mixtures which are suitable for producing deep black dyeings on cellulose fiber materials have already been disclosed in Japanese Patent Application Publications Hei-2-073870 and Hei-2-202956 and in Korean Patents Nos. 91/2676, 91/6386 and 91/8343. These known dye mixtures, however, have certain applications-related drawbacks; thus, their washoff capacity and their wet lay-up fastness in particular are in need of improvement.

With the present invention, dye mixtures have been found which comprise one or more, such as 2, 3 or 4, disazo dyes of the formula (1) and one or more, such as 2, 3 or 4, monoazo dyes of the formula (2).

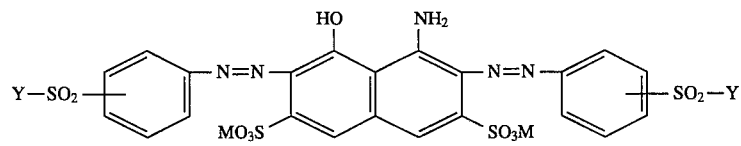

(1)

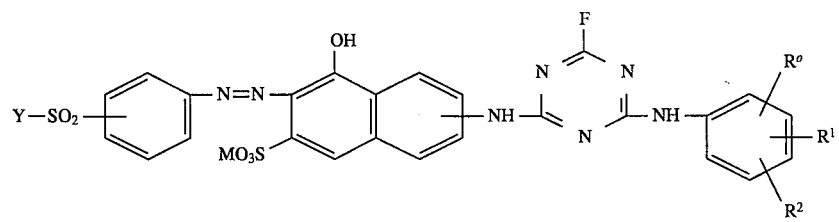

(2)

In these formulae

M is hydrogen or an alkali metal such as lithium, sodium and potassium;

$R^o$ is sulfo or carboxy;

$R^1$ is hydrogen, methyl, ethyl, methoxy, ethoxy, sulfo or carboxy, preferably methoxy and hydrogen and especially hydrogen;

$R^2$ is hydrogen, methyl, ethyl, methoxy or ethoxy, preferably hydrogen;

Y is at each occurrence independently of the others vinyl, β-chloroethyl, β-phosphatoethyl, β-thiosulfatoethyl or β-sulfatoethyl, preferably vinyl and especially β-sulfatoethyl;

in formula (2) the fluorotriazinylamino group is attached in position 2 or 3 to the 8-hydroxy- 6-sulfonaphthalene radical.

Within the scope of the definition, the individual formula components in formulae (1) and (2) and likewise in the formulae specified below may have meanings which are the same as or different from one another.

In general the disazo dye(s) of the formula (1) and the azo dye(s) of the formula (2) are present in the mixture in a molar ratio of from 1:0.3 to 1:1.4; preferably the molar ratio of (1):(2) is from 1:0.5 to 1:1.

The dye mixtures according to the invention may additionally comprise as shading components, up to 10% by weight, in particular up to 5% by weight, based on the dye mixture of the invention, of one or more, such as 2, or 4, monoazo dyes of the formulae (3a), (3b) and/or (3c)

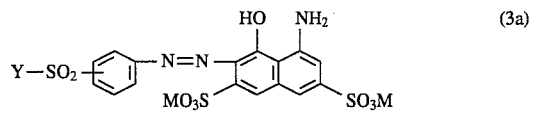

(3a)

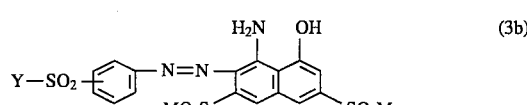

(3b)

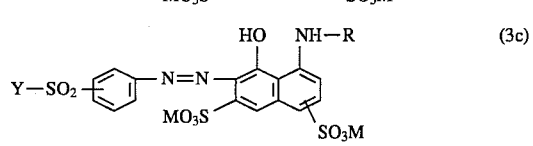

(3c)

in which M and Y are as defined above and one group —$SO_3M$ in formula (3c) is meta or para to the group —NHR and R is alkanoyl of 2 to 5 carbon atoms such as propionyl and acetyl, or is benzoyl or is 2,4-di(cyanoamino)- 1,3,5-triazin-6-yl or a group of the formula (4a) or (4b)

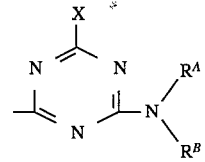

(4a)

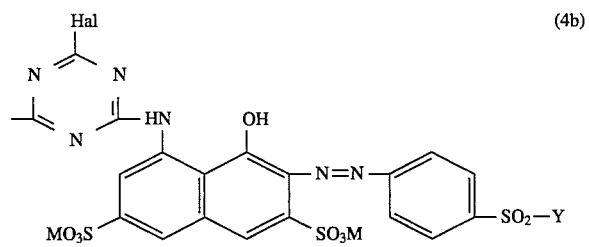

(4b)

in which M and Y are as defined above, X is chlorine, fluorine or cyanoamino, Hal is chlorine or fluorine, $R^A$ is hydrogen or alkyl of 1 to 4 carbon atoms such as methyl or ethyl, which may be substituted by phenyl or by phenyl which is substituted by 1 or 2 substituents from the group consisting of sulfo, carboxy, methyl, ethyl, methoxy and ethoxy, and is preferably hydrogen, and $R^B$ is alkyl of 1 to 4 carbon atoms such as methyl or ethyl, which may be substituted by phenyl or by phenyl which is substituted by 1 or 2 substituents from the group consisting of sulfo, carboxy, methyl, ethyl, methoxy and ethoxy, or is monosulfophenyl or disulfophenyl, preferably 3-sulfophenyl, or $R^A$ and $R^B$ together with the nitrogen atom form a saturated heterocyclic radical carrying an alkylene of 4 to 7 carbon atoms, preferably 5 carbon atoms, or carrying two alkylenes of 1 to 4 carbon atoms and a further hetero-group such as —O— or —NH—, for example the N-piperidino, N-piperazino or preferably the N-morpholino radical.

A sulfo group is a group of the formula —$SO_3M$, a carboxy group is a group of the formula —COOM, a phosphato group is a group of the formula —$OPO_3M_2$, a sulfato group is a group of the formula —$OSO_3M$ and a thiosulfato group is a group of the formula —S—$SO_3M$.

In formulae (1), (2) and (3) the groups —$SO_2$-Y are preferably meta and especially preferably para to the azo group on the benzene ring.

The dyes of the formula (1) are described in the literature:; for example, they are known from U.S. Pat. No. 2,657 205, from Japanese Patent Application Publication Sho-58-160 362 and from U.S. Pat. No. 4,257,770 and the literature cited therein. The monoazo dyes of the formula (2) have in some cases been described, for example in European Patent Application Publication No. 0 040 806, or can be synthesized in analogy to the information given therein. The dyes of the formulae (3) are likewise known from the literature, for example from European Patent Application Publications Nos. 0 032 187 and 0 542 214 and from German Patent No. 2 748 965, or can be prepared in analogy to known procedures for the coupling of the corresponding diazo and coupling components.

Examples of radicals of diazo components in the formulae (1), (2) and (3) are 3-(β-sulfatoethylsulfonyl)phenyl and 4-(β-sulfatoethylsulfonyl)phenyl and the vinylsulfonyl, β-chloroethylsulfonyl and β-thiosulfatoethylsulfonyl and β-phosphatoethylsulfonyl derivatives thereof; among these, 4-(β-sulfatoethylsulfonyl)phenyl and 4-vinylsulfonylphenyl are preferred.

Examples of radicals of the formula (5)

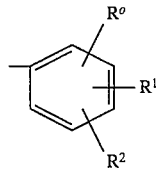

(5)

in the dyes of the formula (2) are 2-sulfophenyl, 3-sulfophenyl, 4-sulfophenyl, 2-carboxyphenyl, 3-carboxyphenyl, 4-carboxyphenyl, 3-sulfo-4-methylphenyl, 2,5-disulfophenyl, 2-carboxy-5-sulfophenyl, 3,5-dicarboxyphenyl, 2,3-dicarboxyphenyl, 2,5-dicarboxyphenyl, 2-sulfo- 4-methoxyphenyl and 4-sulfo-2,5-dimethoxyphenyl.

Examples of radicals R in the dyes of the formula (3c), in addition to the alkanoyl and benzoyl groups already mentioned and 2,4-di(cyanoamino)-1,3,5-triazin-6-yl, which has also been mentioned already, are 2-chloro-4-( 3'-sulfophenylamino)-1,3,5-triazin-6-yl, 2-fluoro-4-(3'-sulfophenylamino)- 1,3,5-triazin-6-yl, 2-cyanoamino-4-(3'-sulfophenylamino)-1,3,5-triazin-6-yl, 2-cyanoamino -4-(4'-sulfophenylamino)-1,3,5-triazin-6-yl, 2-chloro-4-(4'-sulfophenylamino)-1,3,5-triazin -6-yl, 2-fluoro-4-(4'-sulfophenylamino)- 1,3,5-triazin-6-yl, 2-fluoro-4-(2'-sulfophenylamino)-1,3,5-triazin-6-yl, 2-chloro- 4-(2'-sulfophenylamino)-1,3,5,-triazin-6-yl, 2-chloro-4-{4'-[7'-(4"-β-sulfatoethylsulfonyl)azo-3',6'-disulfo-8'-hydroxy-1'-naphthyl}amino-1,3,5-triazin-6-yl, 2-fluoro-4-{4'-[7'-(4"-β-sulfatoethylsulfonyl)azo-3',6'-disulfo-8'-hydroxy-1'-naphthyl}amino-1,3,5-triazin-6-yl and fluoro-4-morpholino-1,3,5-triazin-6-yl.

Both the dyes of the formula (1) and the dyes of the formula (2), especially when they have the same chromophore, may possess different fiber-reactive groups —$SO_2$—Y within the definition of Y. In particular, the dye mixtures may comprise dyes of the formula (1) of the same chromophore and/or dyes of the formula (2) of the same chromophore in which the fiber-reactive groups —$SO_2$—Y are in one portion of the dye of same chromophore vinylsulfonyl groups and in the other one β-chloroethylsulfonyl or β-thiosulfatoethylsulfonyl or, preferably, β-sulfatoethylsulfonyl groups. If the dye mixtures contains such a dye component in the form of a vinylsulfonyl dye, then the proportion of that vinylsulfonyl dye to the respective β-chloro- or β-thiosulfato- or β-sulfatoethylsulfonyl dye is up to about 30 mol %, based on the their dye chromophore.

Preference is given in this context to those dye mixtures in which the molar ratio of the vinylsulfonyl dyes to the β-sulfatoethylsulfonyl dyes is between 2:98 and 30:70.

The dye mixtures of the invention may be present as preparations in solid or in liquid (dissolved) form.

They generally contain the electrolyte salts which are customary in the case of water-soluble and, in particular, fiber-reactive dyes, such as sodium chloride, potassium chloride and sodium sulfate, and may also contain the assistants which are customary in commercial dyes, such as buffer substances capable of establishing a pH in aqueous solution of between 3 and 7, such as sodium acetate, sodium borate, sodium hydrogen carbonate, sodium dihydrogen phosphate and disodium hydrogen phosphate, small quantities of siccatives if present in solid form and, if present in liquid, aqueous solution (which includes the presence of thickeners, as are customary in print pastes), substances which ensure the permanence of these preparations, for example mold preventatives.

In general the dye mixtures of the invention will take the form of dye powders containing from 10 to 80% by weight, based on the dye powder or the preparation, of a strength-standardizing diluent electrolyte salt. These dye powders may in addition contain the abovementioned buffer substances in a total quantity of up to 5%, based on the dye powder. If the dye mixtures of the invention are present in aqueous solution, then the total dye content of these aqueous solutions is up to about 50% by weight, for example between 5 and 50% by weight, the electrolyte salt content of these aqueous solutions preferably being below 10% by weight, based on the aqueous solution; the aqueous solutions (liquid preparations) can in general contain the abovementioned buffer substances in a quantity of up to 5% by weight, preferably up to 2% by weight.

The dye mixtures of the invention can be prepared in a conventional manner, for instance by mechanically mixing the individual dyes in the required proportions or by synthesis by means of the customary diazotization and coupling reactions, using appropriate mixtures of the diazo and coupling components, in a manner familiar to those skilled in the art and in the necessary proportions. One option is, for example, to react 1-amino- 8-naphthol-3,6-disulfonic acid with an appropriate excess of a diazonium salt of the amine of the formula (6)

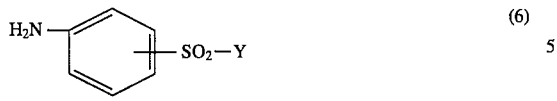
(6)

where Y is as defined above at a pH of between 0.3 and 2.5 and at a temperature of between 0° and 20° C. to give the abovementioned monoazo compound of the formula (3b), then to raise the pH to from 4 to 7, to add to the batch a compound of the formula (7)

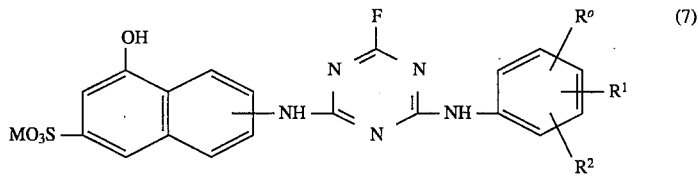
(7)

where M, $R^o$, $R^1$ and $R^2$ are as defined above and to complete the coupling reaction at a pH of between 4 and 7, preferably between 5 and 6, and at a temperature of between 0° and 20° C. to give the azo dyes of the formulae (1) and (2). The dye mixture of the invention can also be prepared by chemical means by mixing starting compounds of the formulae (3b) and (7) with one another mechanically, dissolving the mixture in water (or mixing aqueous solutions of these components with one another), adding the appropriate quantity of the diazonium salt of the amine of the formula (6) and carrying out the coupling reactions at a pH of between 3 and 7, preferably between 4 and 6, and at a temperature of between 0° and 20° C.

The resulting dye mixture can be isolated from the solution in a conventional manner, for example by salting out with an electrolyte salt, such as sodium chloride, potassium chloride or lithium chloride, or by spray drying.

If the dye mixtures of the invention are prepared by mechanical mixing of the individual dyes, then any required strength-standardizing diluents, antidusting agents or further assistants which are customary in dyeing techniques and in the dye preparations used for this purpose are added during the mixing operation.

Among the compounds of the formula (2), compounds of the formula (2A)

the 8-hydroxynaphthalene radical have not been described beforehand and are therefore novel. The present invention therefore relates also to the monoazo compounds of the formula (2A), to a process for their preparation and to their use as dyes.

The compounds of the formula (2A) can be prepared in accordance with the invention by diazotizing a compound of the formula (6) in a conventional and known manner (for example in a solution containing hydrochloric acid by means of an alkali metal nitrite at a pH of below 2 and at a temperature of between −5° C. and +10° C.) and coupling the resulting diazonium salt with a compound of the formula

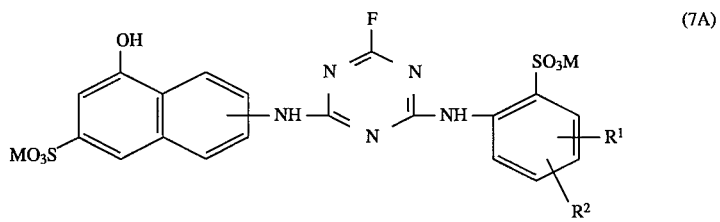
(7A)

in which M, $R^1$ and $R^2$ are as defined above and the fluorotriazinylamino radical is attached in position 2 or to the 8-hydroxynaphthalene radical at a pH of between and 7, preferably between 4 and 6, and at a temperature between 0° and 20° C., or by reacting a compound of the formula (8)

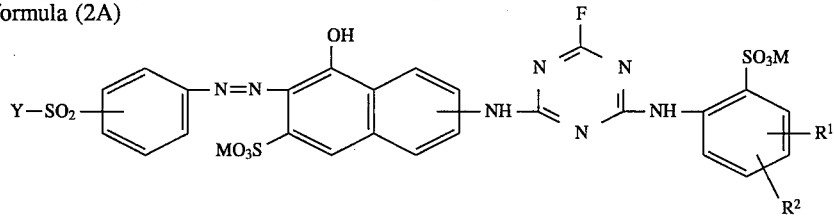
(2A)

in which M, Y, $R^1$ and $R^2$ are as defined above and the fluorotriazinylamino radical is attached in position 2 or to

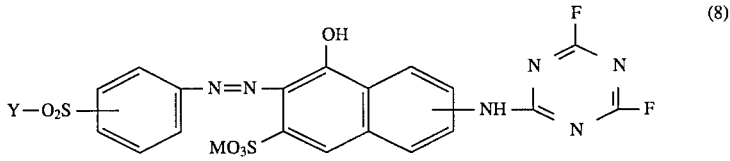

in which Y and M are as defined above and the difluorotriazinylamino radical is attached in position 2 or 3 to the 8-hydroxy-6-sulfonaphthalene radical with a compound of the formula (9)

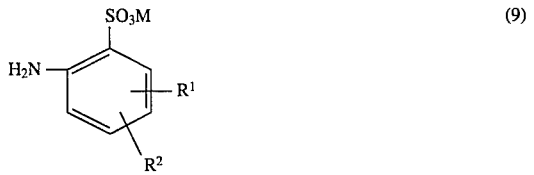

where M, $R^1$ and $R^2$ are as defined above at a pH of between 2 and 7, preferably between 3 and 6, and at a temperature of between 5° and 20° C., preferably between 5° and 10° C., or by reacting a compound of the formula (10)

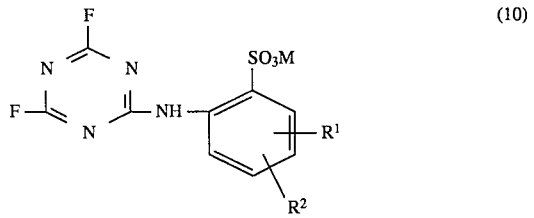

where M, $R^1$ and $R^2$ are as defined above at a pH of between 4 and 7, preferably between 5 and 6, and at a temperature of between −5° C. and +20° C., preferably between 0° and 10° C., with a compound of the formula (11)

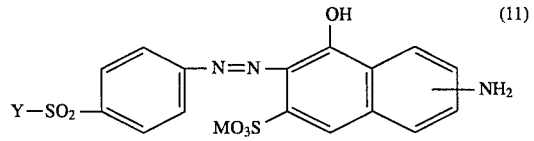

in which M and Y are as defined above and the free amino group is attached in position 2 or 3 to the 8-hydroxy-6-sulfonaphthalene radical.

The starting compounds of the formula (7A) can be prepared by reacting, in analogy to the procedure described in German Offenlegungsschrift 2 746 109, trifluorotriazine with an amino compound of the formula (9) and reacting the resulting difluorotriazinylamino compound of the formula (10) with 2- or 3-amino- 6-sulfo- 8-naphthol at a temperature of between 0° and 20 ° C., preferably between 5° and 10° C., and at a pH of between 2 and 7, preferably between 3 and 6.5. The starting compounds of the formula (8) can be prepared by reacting the azo compound which is obtained by coupling reaction of 2- or 3-amino-6-sulfo-8-naphthol with the diazonium salt of the amine of the formula (6) with cyanuric fluoride (trifluorotriazine) at a temperature of between 0° and 5° C. and at a pH of between 2 and 7, preferably between 3 and 6.

The monoazo compounds according to the invention of the formula (2A) possess very good dye properties. When employed by the application and fixing methods which are customary in the art for fiber-reactive dyes, they give strong fast dyeings and prints in orange to brown shades on hydroxy- and/or carboxamido-containing fiber materials.

Hydroxy-containing fiber materials are those of natural or synthetic origin, for example cellulose fiber materials, also in the form of paper, or their regenerated products and polyvinyl alcohols. Cellulose fiber materials are preferably cotton but may also be other vegetable fibers, such as linen, hemp, jute and ramie fibers; regenerated cellulose fibers are for example staple viscose and filament viscose.

Examples of carboxamido-containing fiber materials are synthetic and natural polyamide or polyurethane fibers, for example wool and other animal hairs, silk, leather, nylon 6.6, nylon 6, nylon 11 and nylon 4.

The mixtures of the invention comprising the dyes of the formulae (1) and (2) dye hydroxy- and/or carboxamido-containing fiber materials by the application and fixing methods described in many instances in the art for fiber-reactive dyes, in deep black shades with good color buildup and good washoff capacity in respect of unfixed dye portions.

The present invention therefore also provides for the use of the novel monoazo compounds of the formula (2A) and of the dye mixtures of the invention for dyeing (including printing) hydroxy- and/or carboxamido-containing fiber materials and processes for dyeing such fiber materials using a novel dye of the formula (2A) or a dye mixture of the invention, by applying the dye or dyes (dye mixture) in dissolved form to the substrate and fixing the dyes on the fiber by the action of an alkali or by heat or by means of both measures.

The application of the dyes and dye mixtures of the invention is carried out in accordance with generally known processes for dyeing and printing fiber materials by the known application techniques for fiber-reactive dyes. Since the dyes of the dye mixtures according to the invention are highly compatible with one another, the dye mixtures of the invention can also be employed with advantage in exhaust dyeing processes. Applied by the exhaust process, for example to cellulose fibers, from a long liquor at temperatures of between 40° and 105 ° C., if desired at temperatures of up to 130° C. and at super-atmospheric pressure, and, if desired, in the presence of customary dyeing assistants with the use of acid-binding agents and, if desired, neutral salts such as sodium chloride or sodium sulfate, they produce dyeings in very good yields and with excellent color buildup and consistent shade. In this context one possible procedure is to introduce the material into the warm bath, to gradually heat the bath to the desired dyeing temperature and to complete the dyeing process at this temperature. The neutral salts which speed up the exhaustion of the dyes can also, if desired, be added to the bath only after the actual dyeing temperature has been reached.

Similarly, the conventional printing processes for cellulose fibers—which can either be carried out in a single phase, for example by printing with a print paste containing sodium bicarbonate or another acid-binding agent and the colorant and subsequent steaming at from 100° to 103° C., or in two phases, for example by printing with a neutral or weakly acid print paste containing the colorant and subsequent fixation, either by passing the printed material through a hot electrolyte-containing alkaline bath or by overpadding with an alkaline electrolyte-containing padding liquor, and subsequent hatching of this treated material or subsequent steaming or subsequent treatment with dry heat—produce strong prints with well-defined contours and a clear white ground. Changing the fixing conditions has little effect on the outcome of the prints. Not only in dyeing but also in printing the degrees of fixation obtained with the dye mixtures of the invention are very high. The hot air used in dry-heat fixing by the customary thermofix processes is at from 120° to 200° C. In addition to the customary steam at from 101° to 103° C. it is also possible to employ superheated steam and high-pressure steam at temperatures of up to 160° C.

The acid-binding agents responsible for fixing the dyes on the cellulose fibers are, for example, water-soluble basic salts of alkali metals and of alkaline earth metals of inorganic or organic acids, and compounds which release alkali under hot conditions. It is possible in particular to mention the alkali metal hydroxides and alkali metal salts of weak to medium-strength inorganic or organic acids, the preferred alkali metal compounds being the sodium and potassium compounds. Examples of such acid-binding agents are sodium hydroxide, potassium hydroxide, sodium carbonate, sodium bicarbonate, potassium carbonate, sodium formate, sodium dihydrogen phosphate and disodium hydrogen phosphate.

The compounds of the formula (2A) according to the invention, may be employed in the dyeing and printing processes in the same manner as described above for the dye mixtures.

The treatment of the dyes with the acid-binding agents, with or without the action of heat, bonds the dyes chemically to the cellulose fiber; dyeings on cellulose in particular, after they have been given the usual aftertreatment of rinsing to remove unfixed dye portions, exhibit excellent wet fastness properties, especially since the unfixed dye portions are readily washed off because oft their good cold-water solubility.

The dyeings on polyurethane and polyamide fibers are customarily carried out from an acid medium. For example, acetic acid and/or ammonium sulfate or acetic acid and ammonium acetate or sodium acetate may be added to the dyebath in order to bring it to the desired pH. To obtain a dyeing of acceptable levelness it is advisable to add customary leveling assistants, for example based on a reaction product of cyanuric chloride with three times the molar quantity of an aminobenzenesulfonic acid or aminonaphthalenesulfonic acid or based on a reaction product of, for example, stearyl amine with ethylene oxide. In general the material to be dyed is introduced into the bath at a temperature of about 40° C. and agitated therein for some time, and then the dyebath is adjusted to the desired weakly acid, preferably weakly acetic acid, pH, and the actual dyeing is carried out at a temperature of between 60° and 98° C. However, the dyeings can also be carried out at boiling temperature or at temperatures of up to 120° C. (under superatmospheric pressure).

The Examples which follow serve to illustrate the invention. Parts and percentages are by weight unless stated otherwise. Parts by weight bear the same relation to parts by volume as the kilogram to the liter. In the Examples the dye formulae are indicated in the form of the free acid; the proportions relate to the acid form. In general, however, the dyes are employed in the form in which, as water-soluble dyes, they are customarily present, as an alkali metal salt powder containing electrolyte salt (for example sodium chloride and sodium sulfate).

Example 1

35.4 parts of 2-aniline sulfonic acid are reacted with 29.8 parts of 2,4,6-trifluoro-1,3,5-triazine in accordance with the information in German Offenlegungsschrift No. 2 746 109. Subsequently, 47 parts of 3-amino-8-naphthol-6-sulfonic acid are added to the mixture with stirring, a pH of 6 is established and the reaction is brought to completion while maintaining this pH by means of an aqueous lithium hydroxide solution at a temperature of from 5° to 10° C. for about three hours. The compound prepared is precipitated from the synthesis solution by salting out with sodium chloride and is filtered off.

50.7 parts of the compound prepared in this way, which is used as coupling component—3-[2'- fluoro-4 '-(2"-sulfophenyl)amino-1',3',5'-triazin- 6'-yl]amino-8-naphthol-6-sulfonic acid—are suspended in 800 parts by volume of ice-water,and to this suspension is added an aqueous suspension, containing hydrochloric acid, of the conventionally prepared diazonium salt of 28.1 parts of 4-(β-sulfatoethylsulfonyl)aniline over the course of 30 minutes, while maintaining a pH of between 5 and 6 and a temperature of between 0° and 15° C. and while stirring (the maintenance of the pH range can be carried out by continuous addition of aqueous sodium carbonate solution). The mixture is subsequently stirred for about one hour, a pH of 7 is established, a few parts of sodium dihydrogen phosphate and disodium hydrogen phosphate as phosphate buffer are added if desired, and the monoazo compound of the invention which has been prepared is isolated in a conventional manner by spray drying or by salting out with sodium chloride as alkali metal salt. Written in the form of the free acid, it has the formula

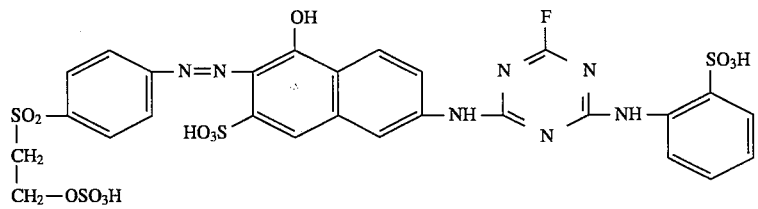

($\lambda_{max}$ = 476 nm)

shows very good fiber-reactive dye properties and, when applied to the materials mentioned in the description such as, in particular, cellulose fiber materials, for example cotton, gives dyeings and prints in strong golden orange shades.

Examples 2 to 9

In the Tabular Examples which follow, further monoazo compounds of the invention which conform to the formula (A)

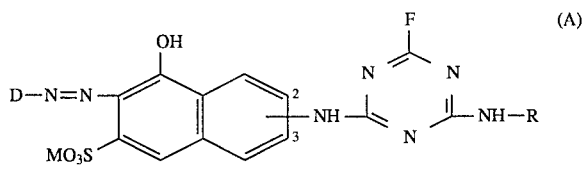

are described on the basis of their components. They can be prepared in the manner of the invention from the starting compounds which are evident from the formula (A) (the diazo component D—NH$_2$, 2- or 3-amino- 6-sulfo-8-naphthol, cyanuric fluoride and the aniline of the formula H$_2$N—R). They possess very good fiber-reactive dye properties and dye the materials mentioned in the description, such as, in particular, cellulose fiber materially, in the shade indicated in the respective tabular example (in this case for cotton) with high color strength and with good fastness properties.

| | Azo compound of the formula (A) | | | |
|---|---|---|---|---|
| Ex. | Radical D | Group-NH- | Radical R | Shade |
| 2 | 4-(β-sulfato-ethyl-sulfonyl)-phenyl | in position 3 | 4-methyl-2-sulfo-phenyl | orange |
| 3 | 4-(β-sulfato-ethyl-sulfonyl)-phenyl | in position 3 | 2,5-di-sulfo-phenyl | orange |
| 4 | 4-(β-sulfato-ethyl-sulfonyl)-phenyl | in position 2 | 2-sulfo-phenyl | orange-brown |
| 5 | 4-(β-sulfato-ethyl-sulfonyl)-phenyl | in position 2 | 2,5-disulfo-phenyl | orange-brown |
| 6 | 4-(β-sulfato-ethyl-sulfonyl)-phenyl | in position 2 | 4-methyl-2-sulfo-phenyl | orange-brown |
| 7 | 4-(vinyl-sulfonyl)-phenyl | in position 2 | 2,5-di-sulfo-phenyl | orange-brown |
| 8 | 4-(β-chloro-ethyl-sulfonyl)-phenyl | in position 2 | 2,5-di-sulfo-phenyl | orange-brown |
| 9 | 3-(β-sulfato-ethyl-sulfonyl)-phenyl | in position 2 | 2,5-di-sulfo-phenyl | orange-brown |

Example A 40 parts of a disazo dye of the formula (1) in which both groups —SO$_2$—Y represent the radical β-sulfatoethylsulfonyl, both of which are attached to the respective benzene ring in the para-position to the azo group, and 13 parts of the dye of the formula

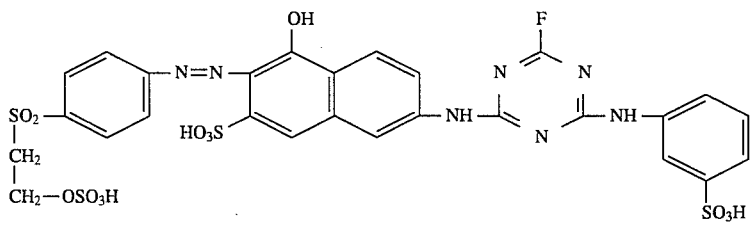

are milled with one another to give a homogeneous mixture. When applied by the methods which are customary in the art for fiber-reactive dyes, for example to cotton, the dye mixture of the invention gives strong deep black dyeings and prints With good fastness properties, among which, in particular, the good wash fastness properties or the good washoff capacity of dye portions which have not been fixed to the fiber material from the dyeing may be emphasized.

Example B 40 parts of a disazo dye of the formula (1) in which both groups —SO$_2$—Y represent the radical β-sulfatoethylsulfonyl, both of which are attached to the respective benzene ring in the para-position to the azo group, and 13 parts of the monoazo dye of Example 1 are milled with one another to give a homogeneous mixture. When applied by the methods which are customary in the art for fiber-reactive dyes, for example to cotton, the dye mixture of the invention gives strong deep black dyeings and prints with good fastness properties, among which, in particular, the good wash fastness properties or the good washoff capacity of dye portions which have not been fixed to the fiber material from the dyeing may be emphasized.

Example C 37.8 parts of 4-(β-sulfatoethylsulfonyl) aniline are diazotized in a conventional manner and this diazonium salt suspension, containing hydrochloric acid, is stirred into a suspension of 32 parts of 1-amino- 8-naphthol-3,6-disulfonic acid in 600 parts of ice-water. Stirring is continued for four hours at 10° C. while maintaining a pH of between 1 and 1.5 by means of sodium hydrogen carbonate, and then 17.8 parts of the compound 3-[2'-fluoro-4'-(3"-sulfophenyl)amino-1', 3',5'-triazin-6'-yl]amino-6-sulfo- 8-naphthol, which can be prepared in analogy to the procedure of Example 1, are added, a pH of between 5 and 6 is established and the mixture is stirred for about three hours more while maintaining this pH range at a temperature of about 5° C. Thereafter the mixture is adjusted to a pH of 7, a few parts of a phosphate buffer are added if desired and the dye mixture of the invention is isolated by spray drying.

It contains 88 parts of the disazo dye 2,7-di[4'-(β-sulfatoethylsulfonyl)phenylazo]-3,6-disulfo-1-amino-8-hydroxynaphthalene and 28 parts of the monoazo dye 7-[4'-(β-sulfatoethylsulfonyl)phenylazo]- 6-sulfo-3-amino-[2"-fluoro-4"-(3'"-sulfophenyl)amino-1",3",5"-triazin-6"-yl] amino-8-hydroxynaphthalene. The dye mixture of the invention displays very good applications-related properties and dyes cotton, for example, in strong deep black shades by the application and fixing methods which are customary in the-art for fiber-reactive dyes.

Example D

The procedure of Example C is repeated but using, instead of the fluorotriazinylaminonaphthol compound used therein, 25 parts of the compound 3-[2'-fluoro -4'-(2"-sulfophenyl)amino-1',3',5'-triazin-6'-yl]amino-6-sulfo-8-naphthol as coupling component.

A dye mixture is obtained which dyes cotton, for example, in deep black shades by the dyeing and printing methods which are customary in the art.

Example E

The procedure of Example C is repeated but using, instead of the fluorotriazinylaminonaphthol compound used therein, 23 parts of the compound 3-[2'-fluoro -4'-(2"-sulfo-4"-methylphenyl)amino- 1',3',5'-triazin-6'-yl]amino- 6-sulfo-8-naphthol as coupling component.

A dye mixture is obtained which dyes cotton, for example, in deep black shades by the dyeing and printing methods which are customary in the art.

Example F

In order to prepare a dye mixture of the invention, the procedure of Example C is repeated but using, instead of 37.8 parts of 4-(β-sulfatoethylsulfonyl)aniline, 43 parts of this compound in the diazotization reaction and employing, as additional coupling component, 10 parts of the compound 1-[2'-chloro-4'-(3"-sulfophenyl)amino- 1',3',5'-triazin-6'-yl]amino-3,6-disulfo -8-naphthol The dye mixture of the invention gives deep black dyeings and prints by the dyeing and printing methods which are customary in the art for fiber-reactive dyes.

Example G

The procedure of Example F is repeated but using, instead of the 1-chlorotriazinylamino-3,6-disulfo-8-naphthol compound indicated therein, 10 parts of the compound 1-(2'-fluoro-4'-morpholino-1',3',5'-triazin -6'-yl)amino- 3,6-disulfo-8-naphthol.

A dye mixture is obtained which dyes cotton, for example, in deep black shades.

We claim:

1. A dye mixture comprising one or more disazo dyes of the formula (1) and one or more monoazo dyes of the formula (2)

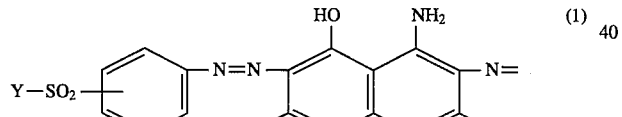

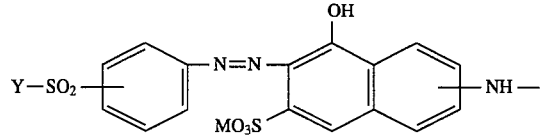

-continued

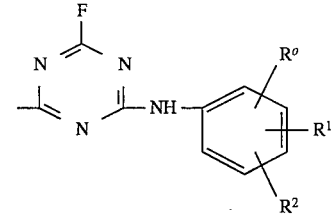

in which:

M is hydrogen or an alkali metal;

$R^o$ is sulfo or carboxy;

$R^1$ is hydrogen, methyl, ethyl, methoxy, ethoxy, sulfo or carboxy;

$R^2$ is hydrogen, methyl, ethyl, methoxy or ethoxy;

Y is at each occurrence independently of the others vinyl, β-chloroethyl, β-thiosulfatoethyl, β-phosphatoethyl or β-sulfatoethyl;

in formula (2) the fluorotriazinyl group is attached in position 2 or 3 to the 8-hydroxy- 6-sulfonaphthalene radical.

2. A dye mixture as claimed in claim 1, wherein the dyes of the formula (1) and the dyes of the formulae (2) are present in the mixture in a molar ratio of from 1.:0.3 to 1:1.4.

3. A dye mixture as claimed in claim 1, wherein the dyes of the formula (1) and the dyes of the formulae (2) are present in the mixture in a molar ratio of from 1:0.5 to 1:1.

4. A monoazo compound of the formula (2A)

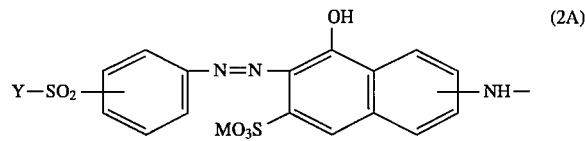

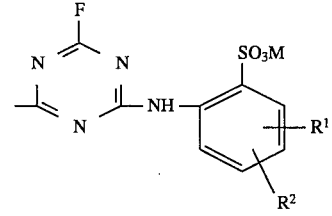

in which

M is hydrogen or an alkali metal,

Y is vinyl, β-chloroethyl, β-phosphatoethyl, β-thiosulfatoethyl or β-sulfatoethyl, $R^1$ is hydrogen, methyl, ethyl, methoxy, ethoxy, sulfo or carboxy, $R^2$ is hydrogen, methyl, ethyl, methoxy or ethoxy, and the fluorotriazinylamino group is attached in position 2 or 3 to the 8-hydroxy- 6-sulfonaphthalene radical.

* * * * *